UNITED STATES PATENT OFFICE.

HUGO GELDERMANN, OF BERLIN, GERMANY, ASSIGNOR TO ACTIEN-GESELLSCHAFT FÜR ANILIN FABRIKATION, OF BERLIN, GERMANY.

DIAMIDODIPHENYLAMIN SULFONIC ACID AND PROCESS OF MAKING SAME.

No. 800,735. Specification of Letters Patent. Patented Oct. 3, 1905.

Application filed November 17, 1904. Serial No. 233,218. (Specimens.)

*To all whom it may concern:*

Be it known that I, HUGO GELDERMANN, of Berlin, in the Kingdom of Prussia, German Empire, have invented new and useful Improvements in the Manufacture of New Diamidodiphenylamin Sulfonic Acids and Processes of Making Same; and I do hereby declare that the following is a full, clear, and exact description of the invention, which will enable others skilled in the art to which it appertains to make and use the same.

I have found that one can produce new diamidodiphenylamin sulfonic acids, which are of very great value for dyeing purposes, by reducing the corresponding nitroamidodiphenylamin sulfonic acid obtained by the action of para-chlornitrobenzene sulfonic acid:

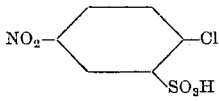

on a meta-diamin of the benzene series, such as meta-phenylenediamin or metatoluylenediamin. These bodies are, as I have stated, an excellent means for dyeing leather in so far as they permit of a thorough penetration of the leather if black tints are to be produced therewith. In doing so these substances are to be used in combination with an oxidizing agent.

In carrying out my process I proceed as follows, the parts being by weight:

Example: Add 32.3 parts of para-methyl-meta-amido-para'-nitrodiphenylamin-ortho'-sulfonic acid, obtained by the action of para-nitrochlorbenzene-ortho-sulfonic acid on metatoluylenediamin, with five hundred parts of water and eighty parts of hydrochloric acid, (12° Baumé,) heat to the boil, and pour in twenty-one parts of zinc powder. The solution being decolorized, render alkaline by the addition of forty-two parts of sodium carbonate, filter the mass and acidify by the addition of dilute hydrochloric acid, so that the reaction will be a weakly-acid one. The reduction product is then precipitated by stirring in solid salt, filtered off and dried. The diamidosulfonic acid thus obtained is with difficulty soluble in water, easily soluble in soda-lye and in dilute hydrochloric acid. The solution in soda-lye becomes blue by the action of the atmospheric oxygen.

If the meta-amido-para'-nitrodiphenylamin-ortho'-sulfonic acid, obtained by the action of para-nitrochlorbenzene-ortho-sulfonic acid on meta-phenylenediamin, is substituted for the para-methyl-meta-amido-para'-nitrodiphenylamin-ortho'-sulfonic acid in the above example I obtain the meta-amido-para'-amido-diphenylamin-ortho'-sulfonic acid, which shows practically the same properties as the diamidodiphenylamin sulfonic acid obtained according to the above example.

Of course many variations may be made as to the proportions of the ingredients and to the temperature used during the reduction without essentially changing the result of my invention. Also instead of hydrochloric acid I may use any suitable mineral or organic acid—as, for instance, sulfuric acid, acetic acid, &c.—or instead of zinc powder I may use iron powder.

Now what I claim is—

1. The process of making new diamidodiphenylamin sulfonic acids from the corresponding dinitro compounds obtained by the action of para-nitro-chlorobenzene-ortho-sulfonic acid upon aromatic meta-diamins of the benzene series, which process consists in treating the nitro compounds with reducing agents in the presence of a weakly-acidulated solution.

2. The process of making a new diamidodiphenylamin sulfonic acid of the following constitution:

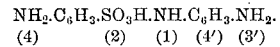

from the corresponding nitro compound obtained by the action of para-nitro-chlorobenzene-ortho-sulfonic acid upon metatoluylenediamin, which process consists in treating at the boil the starting product with zinc powder in the presence of a dilute hydrochloric acid.

3. The new diamidodiphenylamin-sulfonic acids, obtained by the reduction of the corresponding nitro compounds, these being obtained by the action of para-nitro-chlorbenzene-ortho-sulfonic acid upon meta-diamins of the benzene series, these new acids being with difficulty soluble in water, easily soluble in soda-lye and in dilute hydrochloric acid, the solution of which in soda-lye becomes blue by the action of the atmospheric oxygen and the aqueous solution of which shows a blue precipitate on the addition of iron sesquichlorid or potassium bichromate.

4. The new para-methyl-meta-amido-para'-nitro-diphenylamin-ortho'-sulfonic acid, obtained by the reduction of the corresponding nitro compound as above set forth, being with difficulty soluble in water, easily soluble in soda-lye and dilute hydrochloric acid, the solution of which in soda-lye becomes blue by the action of the atmospheric oxygen and the aqueous solution of which shows a blue precipitate on the addition of iron sesquichlorid or potassium bichromate.

In witness whereof I have hereunto signed my name, this 3d day of November, 1904, in the presence of two subscribing witnesses.

HUGO GELDERMANN.

Witnesses:
   HENRY HASPER,
   WOLDEMAR HAUPT.